(12) United States Patent
Meshkati et al.

(10) Patent No.: US 9,497,639 B2
(45) Date of Patent: Nov. 15, 2016

(54) METHODS AND APPARATUS FOR ADAPTING FEMTOCELL PROPERTIES BASED ON CHANGES DETECTED IN NETWORK TOPOLOGY

(71) Applicant: QUALCOMM Incorporated, San Diego, CA (US)

(72) Inventors: Farhad Meshkati, San Diego, CA (US); Yeliz Tokgoz, San Diego, CA (US); Chirag Sureshbhai Patel, San Diego, CA (US); Peerapol Tinnakornsrisuphap, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 13/783,655

(22) Filed: Mar. 4, 2013

(65) Prior Publication Data

US 2013/0235759 A1 Sep. 12, 2013

Related U.S. Application Data

(60) Provisional application No. 61/609,235, filed on Mar. 9, 2012, provisional application No. 61/607,417, filed on Mar. 6, 2012.

(51) Int. Cl.
*H04W 16/18* (2009.01)
*H04W 24/02* (2009.01)
*H04W 52/24* (2009.01)
*H04W 52/14* (2009.01)
*H04W 52/38* (2009.01)
*H04W 36/00* (2009.01)
(Continued)

(52) U.S. Cl.
CPC .............. *H04W 16/18* (2013.01); *H04W 24/02* (2013.01); *H04W 52/244* (2013.01); *H04W 16/10* (2013.01); *H04W 36/0083* (2013.01); *H04W 52/143* (2013.01); *H04W 52/386* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 6,729,929 B1 * | 5/2004 | Sayers et al. | 455/446 |
| 7,031,266 B1 * | 4/2006 | Patel et al. | 370/254 |
| 7,162,203 B1 * | 1/2007 | Brunner | 455/63.1 |

(Continued)

FOREIGN PATENT DOCUMENTS

WO 2011100653 A1 8/2011

OTHER PUBLICATIONS

International Search Report and Written Opinion—PCT/US2013/029456—ISA/EPO—Jul. 3, 2013.

(Continued)

*Primary Examiner* — Steve Young

(57) ABSTRACT

Methods and apparatus are provided for adapting femtocell properties based on changes detected in network topology. A method includes detecting a network topology change associated with a network node. The method includes determining an availability factor of the network node based on the topology change. The method includes setting mobility parameters of at least one mobile entity serviced by the network entity and mitigating interference with at least one neighboring network node based at least in part on the network topology and on at least one adjusted resource parameter of the network entity.

29 Claims, 10 Drawing Sheets

(51) Int. Cl.
*H04W 16/10* (2009.01)
*H04W 84/04* (2009.01)

(56) References Cited

U.S. PATENT DOCUMENTS

| | | | |
|---|---|---|---|
| 7,606,573 B1 | 10/2009 | Vacon et al. | |
| 8,077,662 B2 | 12/2011 | Srinivasan et al. | |
| 8,532,660 B2* | 9/2013 | Zou et al. | 455/436 |
| 8,838,127 B2* | 9/2014 | Chen | H04B 15/00 370/280 |
| 2005/0018612 A1* | 1/2005 | Fitzgerald | H04L 43/50 370/248 |
| 2006/0126536 A1* | 6/2006 | Patel et al. | 370/254 |
| 2009/0092081 A1 | 4/2009 | Balasubramanian et al. | |
| 2010/0238888 A1 | 9/2010 | Sampath et al. | |
| 2011/0130144 A1* | 6/2011 | Schein | H04L 41/12 455/442 |
| 2011/0170437 A1 | 7/2011 | Zhou et al. | |
| 2012/0052793 A1 | 3/2012 | Brisebois et al. | |
| 2012/0052902 A1* | 3/2012 | Zhang | H04W 52/12 455/522 |
| 2012/0083280 A1 | 4/2012 | Liu et al. | |
| 2012/0142392 A1 | 6/2012 | Patel et al. | |
| 2014/0112250 A1* | 4/2014 | Bahrenburg | H04B 1/7083 370/328 |

OTHER PUBLICATIONS

Lopez-Perez, et al., "Enhanced intercell interference coordination challenges in heterogeneous networks", IEEE Wireless Communications, Jun. 2011, pp. 22-30.

Chowdhury M.Z., et al., "Handover Control for WCDMA Femtocell Networks," The Journal of Korea Information and Communication Society, May 2010, 8 pages.

* cited by examiner

METHODS AND APPARATUS FOR ADAPTING FEMTOCELL PROPERTIES BASED ON CHANGES DETECTED IN NETWORK TOPOLOGY

CROSS-REFERENCE TO RELATED APPLICATION

The present Application for Patent claims priority to Provisional Application No. 61/609,235, filed Mar. 9, 2012, entitled "METHODS AND APPARATUS FOR ADAPTING FEMTOCELL POWER AND FREQUENCY/TIME RESOURCES BASED ON CHANGES DETECTED IN NETWORK TOPOLOGY" and Provisional Application No. 61/607,417, filed Mar. 6, 2012, entitled "METHODS AND APPARATUS FOR ADAPTING HANDOVER PARAMETERS BASED ON CHANGES DETECTED IN NETWORK TOPOLOGY", which are assigned to the assignee hereof, and are hereby expressly incorporated in its entirety by reference herein.

BACKGROUND

I. Field

The present disclosure relates generally to communication systems, and more specifically to techniques for deploying small-coverage base stations (e.g., femtocells).

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of mobile entities, such as, for example, user equipments (UEs). A UE may communicate with a base station via the downlink (DL) and uplink (UL). The DL (or forward link) refers to the communication link from the base station to the UE, and the UL (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs.

In recent years, users have started to replace fixed line broadband communications with mobile broadband communications and have increasingly demanded great voice quality, reliable service, and low prices, especially at their home or office locations. In order to provide indoor services, network operators may deploy different solutions. For networks with moderate traffic, operators may rely on macro cellular base stations to transmit the signal into buildings. However, in areas where building penetration loss is high, it may be difficult to maintain acceptable signal quality, and thus other solutions are desired. New solutions are frequently desired to make the best of the limited radio resources such as space and spectrum. Some of these solutions include intelligent repeaters, remote radio heads, and small-coverage base stations (e.g., picocells and femtocells).

The Femto Forum, a non-profit membership organization focused on standardization and promotion of femtocell solutions, defines femto access points (FAPs), also referred to as femtocell units, to be low-powered wireless access points that operate in licensed spectrum and are controlled by the network operator, can be connected with existing handsets, and use a residential digital subscriber line (DSL) or cable connection for backhaul. In various standards or contexts, a FAP may be referred to as a home node B (HNB), home e-node B (HeNB), access point base station, etc.

SUMMARY

Figure 1:
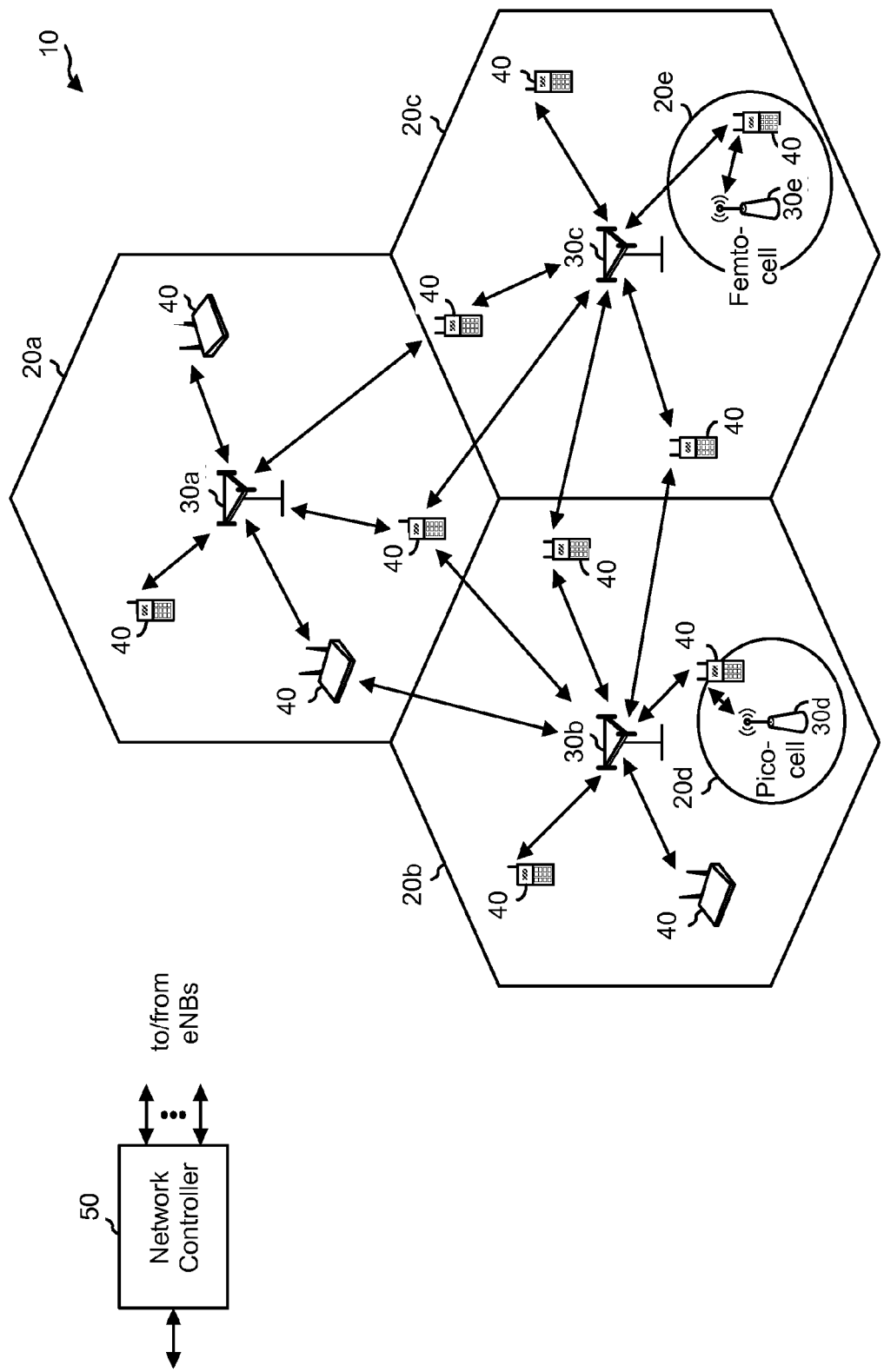
FIG. 1 is a block diagram conceptually illustrating an example of a telecommunications system.

Methods and apparatus for adapting femotocell properties are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method for adapting femtocell properties includes detecting a network topology change associated with a network node. The method includes determining an availability factor of the network node based on the topology change. The method includes setting mobility parameters of at least one mobile entity serviced by the network entity and mitigating interference with the at least one neighboring network node based at least in part on the network topology and on at least one adjusted resource parameter of the network entity.

In another aspect, an apparatus for adapting femtocell properties includes at least one processor configured to detect a network topology change associated with a network node, determine an availability factor of the network node based on the topology change, and set mobility parameters of at least one mobile entity serviced by the network entity and mitigating interference with at least one neighboring network node based at least in part on the network topology and on at least one adjusted resource parameter of the network entity. The apparatus includes a memory coupled to the at least one processor for storing data.

In another aspect, an apparatus for adapting femotocell properties includes means for detecting a network topology change associated with a network node. The apparatus includes means for determining an availability factor of the network node based on the topology change. The apparatus includes means for setting mobility parameters of at least one mobile entity serviced by the network entity and mitigating interference with at least one neighboring network node based at least in part on the network topology and on at least one adjusted resource parameter of the network entity.

In another aspect, a computer program product for adapting femotocell properties includes a computer-readable medium including code for causing at least one computer to: detect a network topology change associated with a network node; determine an availability factor of the network node based on the topology change, and set mobility parameters of at least one mobile entity serviced by the network entity and mitigating interference with at least one neighboring network node based at least in part on the network topology and on at least one adjusted resource parameter of the network entity.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Techniques for interference management in a wireless communication system are described herein. The techniques may be used for various wireless communication networks such as wireless wide area networks (WWANs) and wireless local area networks (WLANs). The terms "network" and "system" are often used interchangeably. The WWANs may be CDMA, TDMA, FDMA, OFDMA, SC-FDMA and/or other networks. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink (DL) and SC-FDMA on the uplink (UL). UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). A WLAN may implement a radio technology such as IEEE 802.11 (Wi-Fi), Hiperlan, etc.

The techniques described herein may be used for the wireless networks and radio technologies mentioned above as well as other wireless networks and radio technologies. For clarity, certain aspects of the techniques are explained in the exemplary context of 3GPP networks, and more particularly in the context of the interference management for such networks. The word "exemplary" is used herein to mean "serving as an example, instance, or illustration." Any embodiment described herein as "exemplary" is not necessarily to be construed as preferred or advantageous over other embodiments.

FIG. 1 shows a wireless communication network 10, which may be an LTE network or some other wireless network (e.g., a 3G network or the like). Wireless network 10 may include a number of evolved Node Bs (eNBs) 30 and other network entities. An eNB may be an entity that communicates with mobile entities (e.g., user equipment (UE)) and may also be referred to as a base station, a Node B, an access point, etc. Although the eNB typically has more functionalities than a base station, the terms "eNB" and "base station" are used interchangeably herein. Each eNB 30 may provide communication coverage for a particular geographic area and may support communication for mobile entities (e.g., UEs) located within the coverage area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area, depending on the context in which the term is used.

An eNB may provide communication coverage for a macro cell, a picocell, a femtocell, and/or other types of cell. A macro cell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having association with the femtocell (e.g., UEs in a Closed Subscriber Group (CSG), or closed access). In the example shown in FIG. 1, eNBs 30a, 30b, and 30c may be macro eNBs for macro cell groups 20a, 20b, and 20c, respectively. Each of the cell groups 20a, 20b, and 20c may include a plurality (e.g., three) of cells or sectors. An eNB 30d may be a pico eNB for a picocell 20d. An eNB 30e may be a femto eNB or femto access point (FAP) for a femtocell 20e.

Wireless network 10 may also include relays (not shown in FIG. 1). A relay may be an entity that can receive a transmission of data from an upstream station (e.g., an eNB or a UE) and send a transmission of the data to a downstream station (e.g., a UE or an eNB). A relay may also be a UE that can relay transmissions for other UEs.

A network controller 50 may couple to a set of eNBs and may provide coordination and control for these eNBs. Network controller 50 may include a single network entity or a collection of network entities. Network controller 50 may communicate with the eNBs via a backhaul. The eNBs may also communicate with one another, e.g., directly or indirectly via a wireless or wireline backhaul.

UEs 40 may be dispersed throughout wireless network 10, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may be able to communicate with eNBs, relays, etc. A UE may also be able to communicate peer-to-peer (P2P) with other UEs.

Wireless network 10 may support operation on a single carrier or multiple carriers for each of the DL and UL. A carrier may refer to a range of frequencies used for communication and may be associated with certain characteristics. Operation on multiple carriers may also be referred to as multi-carrier operation or carrier aggregation. A UE may operate on one or more carriers for the DL (or DL carriers) and one or more carriers for the UL (or UL carriers) for communication with an eNB. The eNB may send data and control information on one or more DL carriers to the UE. The UE may send data and control information on one or more UL carriers to the eNB. In one design, the DL carriers may be paired with the UL carriers. In this design, control information to support data transmission on a given DL carrier may be sent on that DL carrier and an associated UL carrier. Similarly, control information to support data transmission on a given UL carrier may be sent on that UL carrier and an associated DL carrier. In another design, cross-carrier control may be supported. In this design, control information to support data transmission on a given DL carrier may be sent on another DL carrier (e.g., a base carrier) instead of the given DL carrier.

Wireless network 10 may support carrier extension for a given carrier. For carrier extension, different system bandwidths may be supported for different UEs on a carrier. For example, the wireless network may support (i) a first system bandwidth on a DL carrier for first UEs (e.g., UEs supporting LTE Release 8 or 9 or some other release) and (ii) a second system bandwidth on the DL carrier for second UEs (e.g., UEs supporting a later LTE release). The second system bandwidth may completely or partially overlap the first system bandwidth. For example, the second system bandwidth may include the first system bandwidth and additional bandwidth at one or both ends of the first system bandwidth. The additional system bandwidth may be used to send data and possibly control information to the second UEs.

Wireless network 10 may support data transmission via single-input single-output (SISO), single-input multiple-output (SIMO), multiple-input single-output (MISO), and/or multiple-input multiple-output (MIMO). For MIMO, a transmitter (e.g., an eNB) may transmit data from multiple transmit antennas to multiple receive antennas at a receiver (e.g., a UE). MIMO may be used to improve reliability (e.g., by transmitting the same data from different antennas) and/or to improve throughput (e.g., by transmitting different data from different antennas).

Wireless network 10 may support single-user (SU) MIMO, multi-user (MU) MIMO, Coordinated Multi-Point (CoMP), etc. For SU-MIMO, a cell may transmit multiple data streams to a single UE on a given time-frequency resource with or without precoding. For MU-MIMO, a cell may transmit multiple data streams to multiple UEs (e.g., one data stream to each UE) on the same time-frequency resource with or without precoding. CoMP may include cooperative transmission and/or joint processing. For cooperative transmission, multiple cells may transmit one or more data streams to a single UE on a given time-frequency resource such that the data transmission is steered toward the intended UE and/or away from one or more interfered UEs. For joint processing, multiple cells may transmit multiple data streams to multiple UEs (e.g., one data stream to each UE) on the same time-frequency resource with or without precoding.

Wireless network 10 may support hybrid automatic retransmission (HARQ) in order to improve reliability of data transmission. For HARQ, a transmitter (e.g., an eNB) may send a transmission of a data packet (or transport block) and may send one or more additional transmissions, if needed, until the packet is decoded correctly by a receiver (e.g., a UE), or the maximum number of transmissions has been sent, or some other termination condition is encountered. The transmitter may thus send a variable number of transmissions of the packet.

Wireless network 10 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

Wireless network 10 may utilize frequency division duplex (FDD) or time division duplex (TDD). For FDD, the DL and UL may be allocated separate frequency channels, and DL transmissions and UL transmissions may be sent concurrently on the two frequency channels. For TDD, the DL and UL may share the same frequency channel, and DL and UL transmissions may be sent on the same frequency channel in different time periods.

Figure 2:
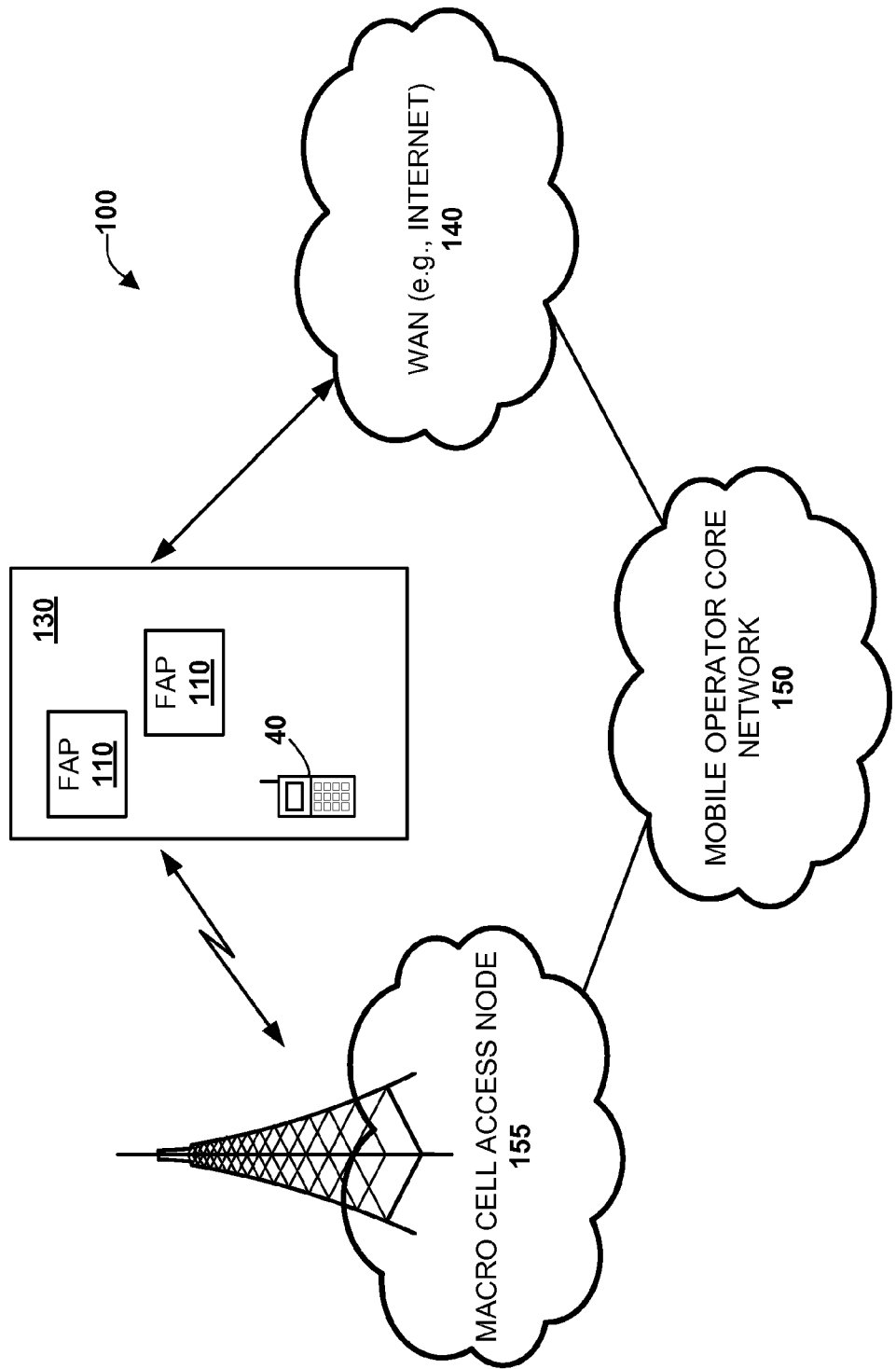
FIG. 2 illustrates a planned or semi-planned wireless communication environment.

FIG. 2 is an illustration of a planned or semi-planned wireless communication environment 100, in accordance with various aspects. Communication environment 100 includes multiple access point base stations, including FAPs 110, each of which are installed in corresponding small scale network environments. Examples of small scale network environments can include user residences, places of business, indoor/outdoor facilities 130, and so forth. The FAPs 110 can be configured to serve associated UEs 40 (e.g., included in a CSG associated with FAPs 110), or optionally alien or visitor UEs 40 (e.g., UEs that are not configured for the CSG of the FAP 110). Each FAP 110 is further coupled to a wide area network (WAN) (e.g., the Internet 140) and a mobile operator core network 150 via a DSL router, a cable modem, a broadband over power line connection, a satellite Internet connection, or the like.

To implement wireless services via FAPs 110, an owner of the FAPs 110 subscribes to mobile service offered through the mobile operator core network 150. Also, the UE 40 can be capable to operate in a macro cellular environment and/or in a residential small scale network environment, utilizing various techniques described herein. Thus, at least in some disclosed aspects, FAP 110 can be backward compatible with any suitable existing UE 40. Furthermore, in addition to the macro cell mobile network 155, UE 40 is served by a predetermined number of FAPs 110, specifically FAPs 110 that reside within a corresponding user residence(s), place(s) of business, or indoor/outdoor facilities 130, and cannot be in a soft handover state with the macro cell mobile network 155 of the mobile operator core network 150. It should be appreciated that although aspects described herein employ 3GPP terminology, it is to be understood that the aspects can also be applied to various technologies, including 3GPP technology (Release 99 [Rel99], Rel5, Rel6, Rel7), 3GPP2 technology (1×RTT, 1×EV-DO Rel0, RevA, RevB), and other known and related technologies.

Figure 3:
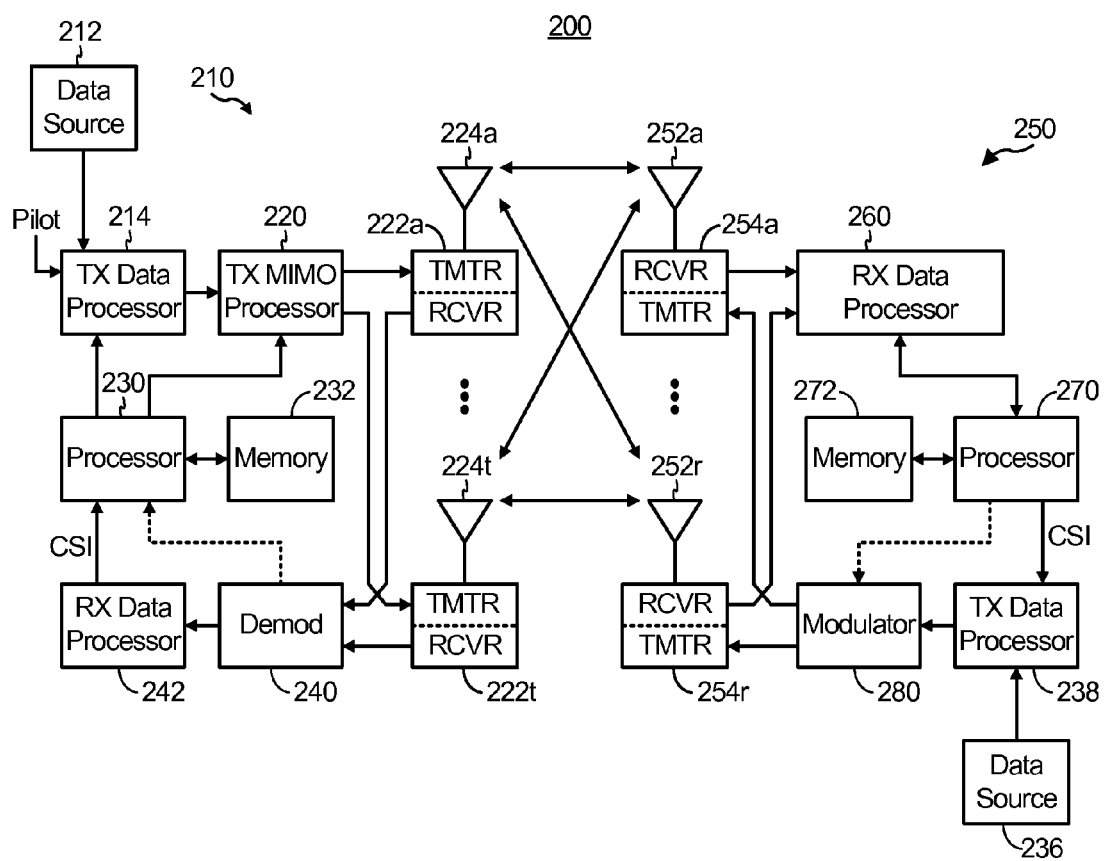
FIG. 3 is a block diagram illustrating a communication system.

FIG. 3 is a block diagram of an embodiment of a transmitter system 210 (also known as an access point) and a receiver system 250 (also known as a UE or the like) in a MIMO system 200. At the transmitter system 210, traffic data for a number of data streams is provided from a data source 212 to a transmit (TX) data processor 214. In an embodiment, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., Binary Phase Shift Keying (BPSK), Quadrature Phase Shift Keying (QSPK), M-ary Phase-Shift Keying (M-PSK), or Multi-Level Quadrature Amplitude Modulation (M-QAM)) selected for that data stream to provide modulation symbols. The data rate, coding, and modulation for each data stream may be determined by instructions performed by a processor 230.

The modulation symbols for all data streams may then be provided to a TX MIMO processor 220, which may further process the modulation symbols (e.g., for OFDM). The TX MIMO processor 220 then provides NT modulation symbol streams to NT transmitters (TMTR) 222a through 222t. In certain embodiments, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At the receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the NR received symbol streams from the NR receivers 254 based on a particular receiver processing technique to provide NT "detected" symbol streams. The RX data processor 260 then demodulates, deinterleaves, and decodes each detected symbol stream to recover the traffic data for the data stream. The processing by the RX data processor 260 is complementary to that performed by the TX MIMO processor 220 and the TX data processor 214 at the transmitter system 210.

A processor 270 periodically determines which pre-coding matrix to use, discussed further below. The processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by the antennas 224, conditioned by the receivers 222, demodulated by a demodulator 240, and processed by a RX data processor 242 to extract the reserve link message transmitted by the receiver system 250. The processor 230 then determines which pre-coding matrix to use for determining the beamforming weights then processes the extracted message.

Figure 4A:
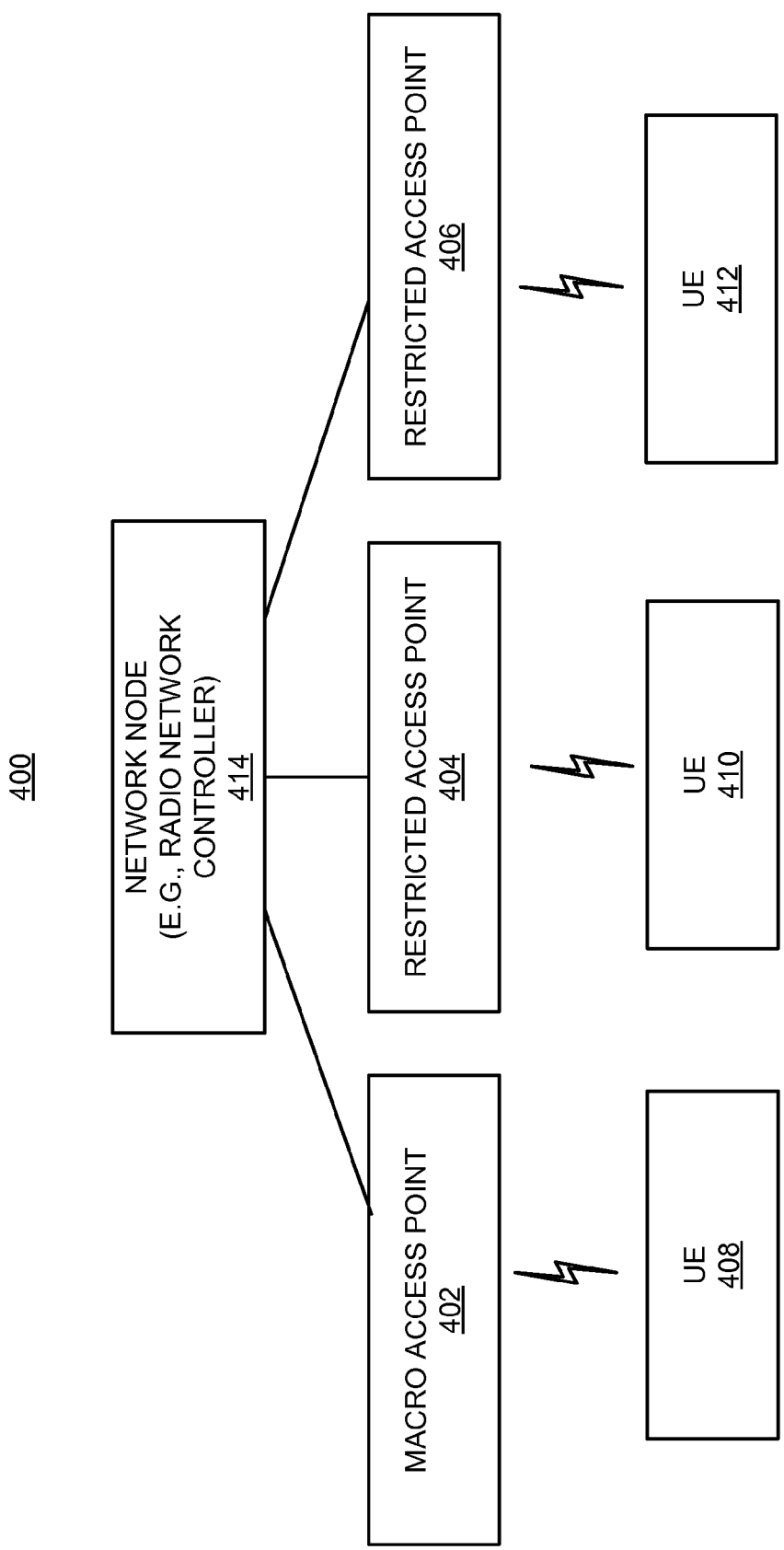
FIG. 4A is a simplified block diagram of several sample aspects of a communication system.

FIG. 4A illustrates sample aspects of a communication system 400 where distributed nodes (e.g., access points 402, 404, and 406) provide wireless connectivity for other nodes (e.g., UEs 408, 410, and 412) that may be installed in or that may roam throughout an associated geographical area. In some aspects, the access points 402, 404, and 406 may communicate with one or more network nodes (e.g., a centralized network controller such as network node 414) to facilitate WAN connectivity.

An access point, such as access point 404, may be restricted whereby only certain mobile entities (e.g., UE 410) are allowed to access the access point, or the access point may be restricted in some other manner. In such a case, a restricted access point and/or its associated mobile entities (e.g., UE 410) may interfere with other nodes in the system 400 such as, for example, an unrestricted access point (e.g., macro access point 402), its associated mobile entities (e.g., UE 408), another restricted access point (e.g., access point 406), or its associated mobile entities (e.g., UE 412). For example, the closest access point to a given UE may not be the serving access point for the given UE. Consequently, transmissions by the given UE may interfere with reception at another UE that is being served by the access point that is closed to the given UE. Frequency reuse, frequency selective transmission, interference cancellation and smart antenna (e.g., beamforming and null steering) and other techniques may be employed to mitigate interference.

Figure 4B:
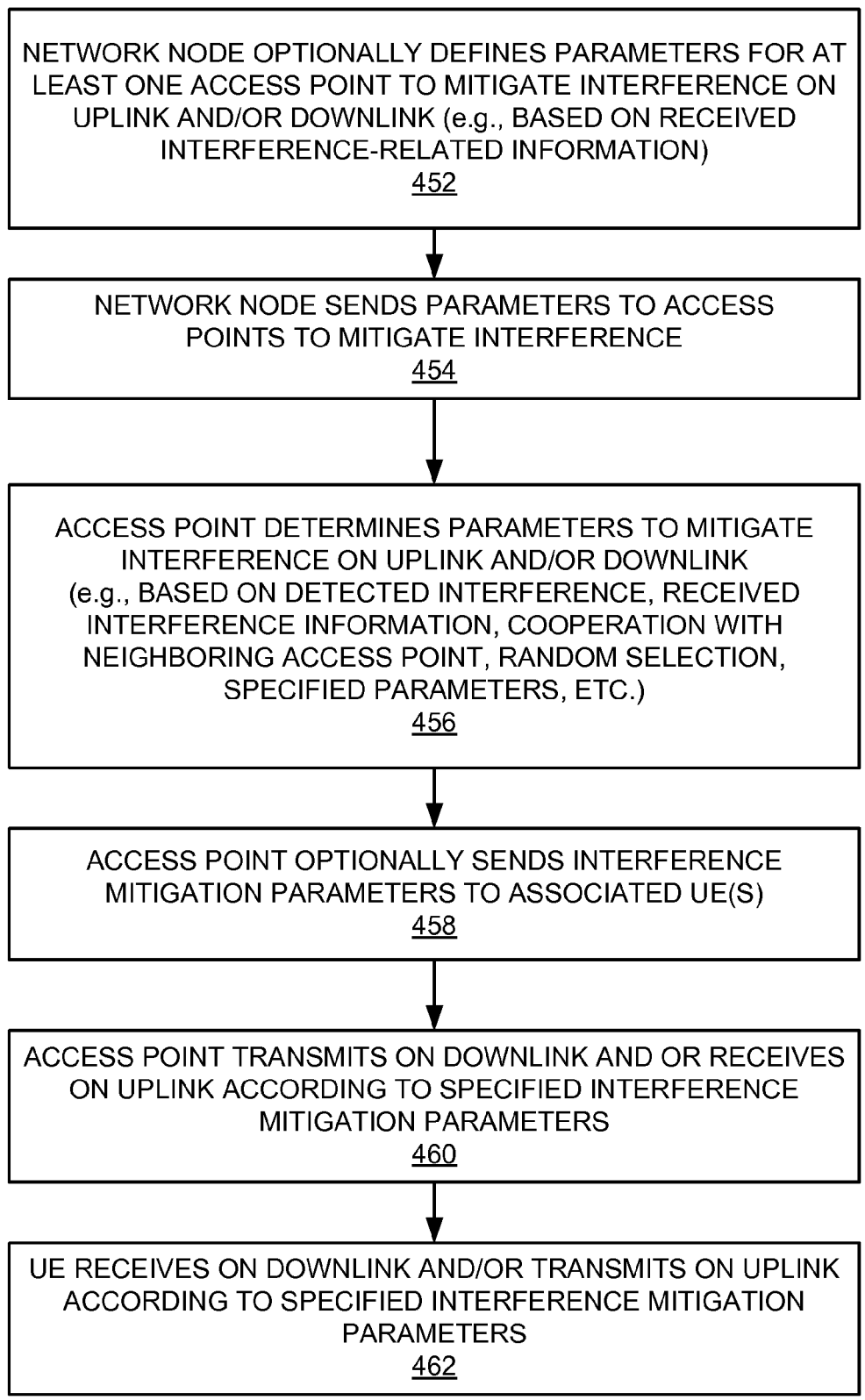
FIG. 4B is a flowchart of several sample aspects of operations that may be performed to manage interference.
Figure 5:
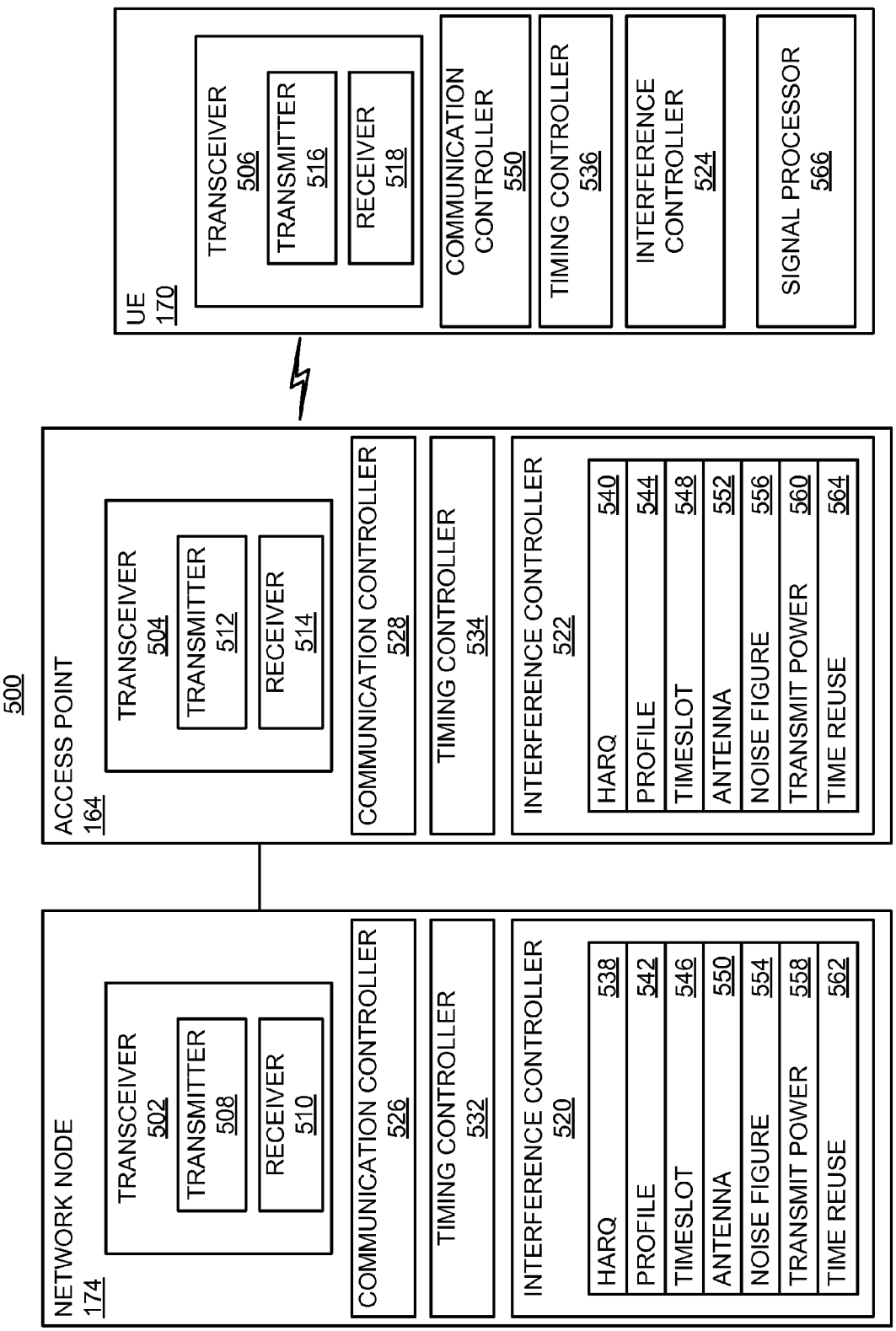
FIG. 5 illustrates aspects of interference management components in a communication system.

Sample operations of a system such as the system 400 will be discussed in more detail in conjunction with the flowchart of FIG. 4B. For convenience, the operations of FIG. 4B (or any other operations discussed or taught herein) may be described as being performed by specific components (e.g., components of the system 400 and/or components of a system 500 as shown in FIG. 5). It should be appreciated, however, that these operations may be performed by other types of components and may be performed using a different number of components. It also should be appreciated that one or more of the operations described herein may not be employed in a given implementation. For illustration purposes various aspects of the disclosure will be described in the context of a network node, an access point, and an UE that communicate with one another. It should be appreciated, however, that the teachings herein may be applicable to other types of apparatuses or apparatuses that are referred to using other terminology.

FIG. 5 illustrates several sample components that may be incorporated into the network node 414 (e.g., a radio network controller), the access point 404, and the UE 410 in accordance with the teachings herein. It should be appreciated that the components illustrated for a given one of these nodes also may be incorporated into other nodes in the system 400.

The network node 414, the access point 404, and the UE 176 include transceivers 502, 504, and 506, respectively, for communicating with each other and with other nodes. The transceiver 502 includes a transmitter 508 for sending signals and a receiver 510 for receiving signals. The transceiver 504 includes a transmitter 512 for transmitting signals and a receiver 514 for receiving signals. The transceiver 506 includes a transmitter 516 for transmitting signals and a receiver 518 for receiving signals.

In a typical implementation, the access point 404 communicates with the UE 410 via one or more wireless communication links and the access point 404 communicates with the network node 414 via a backhaul. It should be appreciated that wireless or non-wireless links may be employed between these nodes or other in various implementations. Hence, the transceivers 502, 504, and 506 may include wireless and/or non-wireless communication components.

The network node 414, the access point 404, and the UE 410 also include various other components that may be used in conjunction with interference management as taught herein. For example, the network node 414, the access point 404, and the UE 410 may include interference controllers 520, 522, and 524, respectively, for mitigating interference and for providing other related functionality as taught herein. The interference controller 520, 522, and 524 may include one or more components for performing specific types of interference management. The network node 414, the access point 404, and the UE 410 may include communication controllers 526, 528, and 550, respectively, for managing communications with other nodes and for providing other related functionality as taught herein. The network node 414, the access point 404, and the UE 410 may include timing controllers 532, 534, and 536, respectively, for managing communications with other nodes and for providing other related functionality as taught herein. The other components illustrated in FIG. 5 will be discussed in the disclosure that follows.

For illustrative purposes, the interference controllers 520 and 522 are depicted as including several controller components. In practice, however, a given implementation may not employ all of these components. Here, a hybrid automatic repeat request (HARQ) controller component 538 or 540 may provide functionality relating to HARQ interlace operations as taught herein. A profile controller component 542 or 544 may provide functionality relating to transmit power profile or receive attenuation operations as taught herein. A timeslot controller component 546 or 548 may provide functionality relating to timeslot portion operations as taught herein. An antenna controller component 550 or 552 may provide functionality relating to smart antenna (e.g., beamforming and/or null steering) operations as taught herein. A receive noise controller component 554 or 556 may provide functionality relating to adaptive noise figure and PL adjustment operations as taught herein. A transmit power controller component 558 or 560 may provide functionality relating to transmit power operations as taught herein. A time reuse controller component 562 or 564 may provide functionality relating to time reuse operations as taught herein.

FIG. 4A illustrates how the network node 414, the access point 404, and the UE 410 may interact with one another to provide interference management (e.g., interference mitigation). In some aspects, these operations may be employed on an UL and/or on a DL to mitigate interference. In general, one or more the techniques described by FIG. 4B may be employed in the more specific implementations that are described in conjunction with FIGS. 6-8 below. Hence, for purposes of clarity, the descriptions of the more specific implementations may not describe these techniques again in detail.

As represented by block 452, the network node 414 (e.g., the interference controller 520) may optionally define one or more interference management parameters for the access point 404 and/or the UE 410. Such parameters may take various forms. For example, in some implementations the network node 414 may define types of interference management information.

In related aspects, the network node 414 may define a parameter based on received information that indicates whether there may be interference on an UL or a DL and, if so, the extent of such interference. Such information may be received from various nodes in the system (e.g., access points and/or UEs) and in various ways (e.g., over a backhaul, over-the-air, and so on).

For example, in some cases one or more access points (e.g., the access point 404) may monitor an UL and/or a DL and send an indication of interference detected on the UL and/or DL to the network node 414 (e.g., on a repeated basis or upon request). As an example of the former case, the access point 404 may calculate the signals strength of signals it receives from nearby UEs that are not associated with (e.g., served by) the access point 404 (e.g., UEs 408 and 412) and report this to the network node 414.

In some cases, each of the access points in the system may generate a load indication when they are experiencing relatively high loading. Such an indication may take the form of, for example, a busy bit in 1×EV-DO, a relative grant channel ("RGCH") in 3GPP, or some other suitable form. In a conventional scenario, an access point may send this information to its associated UE via a DL. However, such information also may be sent to the network node 414 (e.g., via the backhaul).

In some cases, one or more UEs (e.g., the UE 410) may monitor DL signals and provide information based on this monitoring. The UE 410 may send such information to the access point 404 (e.g., which may forward the information to the network node 414) or to the network node 414 (via the access point 404). Other UEs in the system may send information to the network node 414 in a similar manner.

In some cases, the UE 410 may generate measurement reports (e.g., on repeated basis). In some aspects, such a measurement report may indicate which access points the UE 410 is receiving signals from, a received signal strength indication associated with the signals from each access point (e.g., Ec/Io), the PL to each of the access points, or some other suitable type of information. In some cases a measurement report may include information relating to any load indications the UE 410 received via a DL.

The network node 414 may then use the information from one or more measurement reports to determine whether the access point 404 and/or the UE 410 are relatively close to another node (e.g., another access point or UE). In addition, the network node 414 may use this information to determine whether any of these nodes interfere with any other one of these nodes. For example, the network node 414 may determine received signal strength at a node based on the transmit power of a node that transmitted the signals and the PL between these nodes.

In some cases, the UE 410 may generate information that is indicative of the signal to noise ratio (e.g., signal and interference to noise ratio, SINR) on a DL. Such information may comprise, for example a channel quality indication ("CQI"), a data rate control ("DRC") indication, or some other suitable information. In some cases, this information may be sent to the access point 404 and the access point 404 may forward this information to the network node 414 for use in interference management operations. In some aspects, the network node 414 may use such information to determine whether there is interference on a DL or to determine whether interference in the DL is increasing or decreasing.

As will be described in more detail below, in some cases the interference-related information may be used to determine how to mitigate interference. As one example, CQI or other suitable information may be received on a per-HARQ interlace basis whereby it may be determined which HARQ interlaces are associated with the lowest level of interference. A similar technique may be employed for other fractional reuse techniques.

It should be appreciated that the network node 414 may define parameters in various other ways. For example, in some cases the network node 414 may randomly select one or more parameters.

As represented by block 454, the network node 414 (e.g., the communication controller 526) sends the defined interference management parameters to the access point 404. As will be discussed below, in some cases the access point 404 uses these parameters and in some cases the access point 404 forwards these parameters to the UE 410.

In some cases, the network node 414 may manage interference in the system by defining the interference management parameters to be used by two or more nodes (e.g., access points and/or UEs) in the system. For example, in the case of a fractional reuse scheme, the network node 414 may send different (e.g., mutually exclusive) interference management parameters to neighboring access points (e.g., access points that are close enough to potentially interfere with one another). As a specific example, the network node 414 may assign a first HARQ interlace to the access point 404 and assign a second HARQ interlace to the access point 406. In this way, communication at one restricted access point may not substantially interfere with communication at the other restricted access point.

As represented by block 456, the access point 404 (e.g., the interference controller 522) determines interference management parameters that it may use or that may send to the UE 410. In cases where the network node 414 defines the interference management parameters for the access point 404, this determination operation may simply involve receiving the specified parameters and/or retrieving the specified parameters (e.g., from a data memory).

In some cases the access point 404 determines the interference management parameters on its own. These parameters may be similar to the parameters discussed above in conjunction with block 452. In addition, in some cases these parameters may be determined in a similar manner as discussed above at block 452. For example, the access point 404 may receive information (e.g., measurement reports, CQI, DRC) from the UE 410. In addition, the access point 404 may monitor an UL and/or a DL to determine the interference on such a link. The access point 404 also may randomly select a parameter.

In some cases, the access point 404 may cooperate with one or more other access points to determine an interference management parameter. For example, in some cases the access point 404 may communicate with the access point 406 to determine which parameters are being used by the access point 406 (and thereby selects different parameters) or to negotiate the use of different (e.g., mutually exclusive) parameters. In some cases, the access point 404 may determine whether it may interfere with another node (e.g., based on CQI feedback that indicates that another node is using a resource) and, if so, define its interference management parameters to mitigate such potential interference.

As represented by block 458, the access point 404 (e.g., the communication controller 528) may send interference management parameters or other related information to the UE 410. In some cases this information may relate to power control (e.g., specifies UL transmit power).

As represented by blocks 460 and 462, the access point 404 may thus transmit to the UE 410 on the DL or the UE 410 may transmit to the access point 404 on the UL. Here, the access point 404 may use its interference management parameters to transmit on the DL and/or receive on the UL. Similarly, the UE 410 may take these interference management parameters into account when receiving on the DL or transmitting on the UL.

In some implementations the UE 410 (e.g., the interference controller 506) may define one or more interference management parameters. Such a parameter may be used by the UE 410 and/or sent (e.g., by the communication controller 530) to the access point 404 (e.g., for use during UL operations).

As discussed above, an eNB may provide communication coverage for a macro cell, a picocell, a femtocell, and/or other types of cell. Capacity offload gains of a femtocell network are maximized when femtocells are deployed on a dedicated carrier, and thus, there is no interference from a macro network on the same channel as the deployed femtocells. However, because bandwidth is such a scarce resource, bandwidth needs to be allocated and managed with great care and efficiency. Accordingly, an operator may decide if and/or when to dedicate a carrier to femtocells to maximize the capacity of the network.

In accordance with one or more embodiments of the present disclosure, there are provided techniques for adapting handover, cell reselection, or paging parameters based on changes detected in network topology. Specifically, the change in network topology may be detected by a Network Listen Module (NLM), through mobile reports, or a combination of both. For example, a femtocell may use periodic NLM measurements to detect new femto/macro primary scrambling codes (PSCs) on the same channel or other channels. Also, signal measurements such as CPICH RSCP or CPICH Ec/Io or RSSI may be used to detect changes to network topology (e.g., a change in the RSCP level more than a threshold can be considered as a change in the network topology. The NLM may also decode the overhead messages of neighboring cells to detect changes (e.g., decode a CPICH Tx Power field from the broadcast channel). In addition, mobile reports may be used for this purpose. For intra-frequency, detected cell reporting may be used to detect new PSCs. For inter-frequency, PSC rotation may be used to detect a presence of new PSCs via UE reports. Similarly, RF measurements such as RSCP, Ec/Io or RSSI from UE reports may be used for detecting topology changes. The topology change may also be signaled to the femtocell through the backhaul. Changes in the handover/cell reselection/paging statistics may also be an indication of a change in topology.

In an aspect, once a change is detected, a femtocell may need to update cell reselection, handover, or paging parameters. A neighbor cell list and cell info list may need to be updated to include PSCs that have been added and remove PSCs that have been removed. Adding a PSC may be done on a faster timeline (e.g., it may be immediate) whereas removing a PSC may be done on a much slower timeline (e.g., days or weeks) since the neighbor femtocell may be temporarily down/off. A cell ID of the new detected PSCs may be discovered using the NLM (i.e., reading the BCH of the neighbor) or via UE assistance (e.g., Cell Update procedure).

If new PSCs with strong signal levels are detected, the probability of ping-pong may increase. In such a case, the femtocell can take proactive actions by changing the idle and active mobility parameters such as Qhyst, Qoffset, Treselection, Hyst, TTT, CIO, etc. to make the femtocell more sticky and avoid ping pongs or wait until ping pongs happen and react at that time by changing the mobility parameters. Furthermore, the femtocell may update paging related parameters such as LAC/RAC/TAC based on changes in the network topology. For example, the femtocell can update its LAC/RAC/TAC to match the newly detected cells. Alternatively, the femtocell can update its LAC/RAC/TAC to keep it different from that of the newly detected cells.

In accordance with one or more embodiments of the present disclosure, there are provided techniques for adapting femtocell power and frequency/time resources based on changes detected in network topology. In a femtocell network where femtocells are installed by an end user, a network topology may be very dynamic as users may plug/unplug the femtocells, turn the femtocells on/off or change the location of the femtocells within the building (e.g., house, enterprise, large venue, etc.). In addition, an overlay macrocell network may change over time, for example, due to installation of new base stations. Changes in the network topology may affect the coverage area of each femtocell, and therefore mobility patterns of the users in surrounding areas and an amount of interference experienced by each user. It is desirable to detect the changes in the topology and adjust the power and frequency resource allocation to optimize the coverage area of each femtocell based on this new topology and improve user experience both from a mobility and interference point of view.

To adapt femtocell power and frequency/time resources based on changes detected in network topology, the change in network topology may be detected by a Network Listen Module (NLM), through mobile reports, or a combination of both. For example, a femtocell may use periodic NLM measurements to detect new femto/macro primary scrambling codes (PSCs) on the same channel or other channels. Also, signal measurements such as CPICH RSCP or CPICH Ec/Io or RSSI may be used to detect changes to network topology (e.g., a change in the RSCP level more than a threshold may be considered as a change in the network topology). The NLM may also decode the overhead messages of neighboring cells to detect changes (e.g., decode a CPICH Tx Power field from the broadcast channel). In addition, mobile reports may be used for this purpose. For intra-frequency, detected cell reporting may be used to detect new PSCs. For inter-frequency, PSC rotation may be used to detect a presence of new PSCs via UE reports. Similarly, RF measurements such as RSCP, Ec/Io or RSSI from UE reports may be used for detecting topology changes. The topology change may also be signaled to the femtocell through the backhaul. Changes in the handover/cell reselection/paging statistics may also be an indication of a change in topology. The change in network topology (e.g., detected by the Network Listen Module (NLM), through mobile reports, or a combination of both) may determine an availability of any of the network elements in the network topology.

In an aspect, once a change is detected, a femtocell re-evaluates the use of its power and time/frequency resources and makes necessary adjustments. For example, if a femtocell detects a new femtocell deployment in the neighborhood, it may evaluate the strength and reliability of the new femtocell within its coverage area through the use of its own Network Listen measurements and user reports. The femtocell may then decide to reduce its downlink transmit power, orthogonalize its frequency use (e.g., through coordinated use of separate resource blocks, different carriers, etc.) or time use (e.g., through use of separate time blocks, etc.) with this femtocell to reduce the amount of inter-femtocell interference. In another example, if a femtocell detects that an existing femtocell has become unreliable (e.g., not powered on all the time, etc.) or removed, it may similarly adjust its downlink transmit power to make up for the lost coverage and/or better utilize all the frequency and time blocks available. In yet another example, if a femtocell detects some addition/removal of femtocells in the neighborhood that affects user performance resulting in handover unreliability, a performance impact due to a larger number of handovers, a reduction in offloading benefits due to increased user handovers to macrocell networks, it may adjust its downlink transmit power to optimize the coverage and handover boundaries.

Figure 6B:
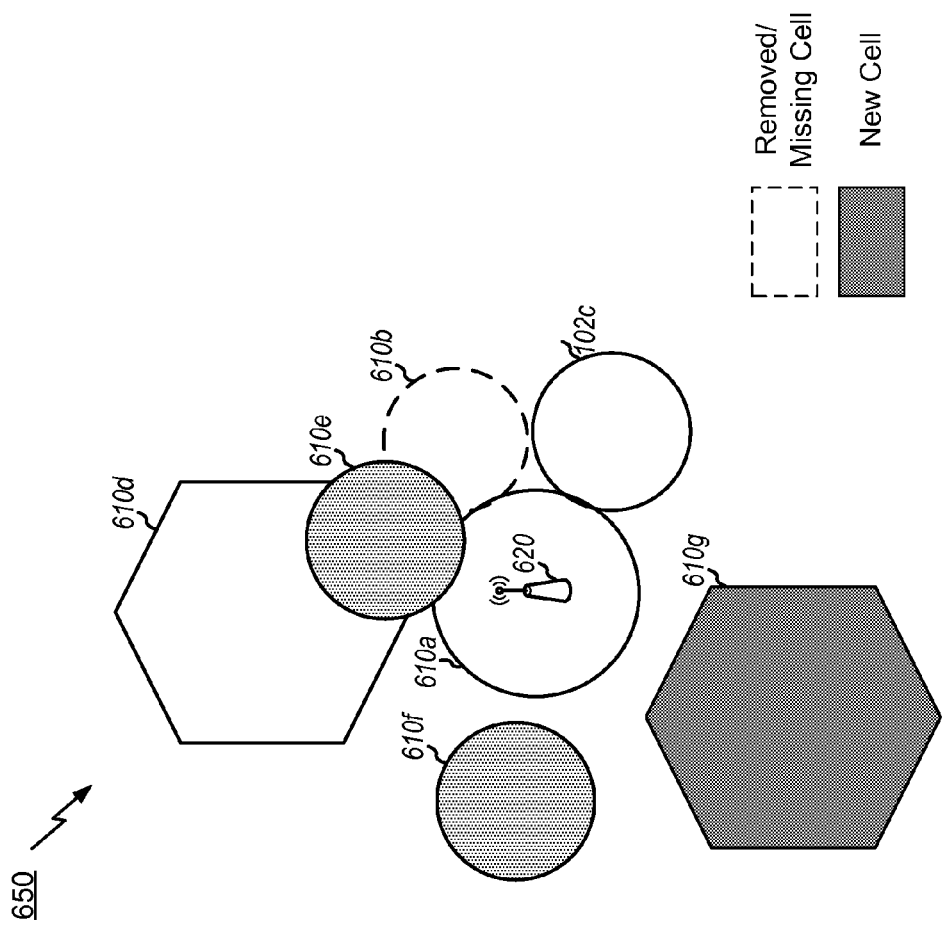
FIG. 6A-B illustrate example network topologies.
Figure 6A:
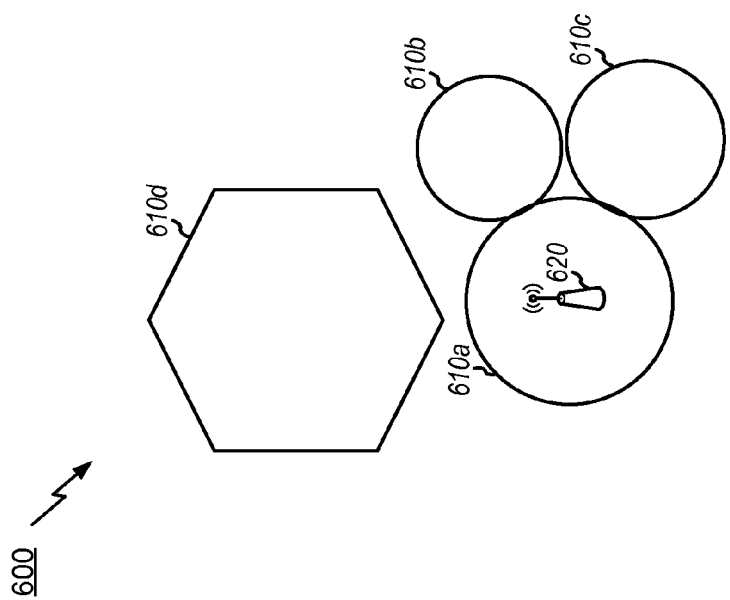

FIGS. 6A-B illustrate example network topologies. FIG. 6A illustrates a first network topology 600. The topology 600 may include network entities and mobile entities. For simplicity of illustration purposes, mobile entities are not shown. In FIG. 6A, the topology 600 includes macrocell 610$d$ and femtocells 610$a$, 610$b$, 610$c$. A network entity, such as femtocell 620, may determine the network topology 600 through any combination of methods including based on configuration information (e.g., provided at deployment time), a detection apparatus such as an NLM, messaging or reports from UEs, etc. In the example of FIG. 6A, femtocell 620 may learn of the topology 600 that includes the cells 610$b$, 610$c$, and 610$d$ based on its NLM. The NLM may detect PSCs on the same or different channels that the femtocell 620 operates on.

FIG. 6B illustrates a second network topology 650. For example, the topology 650 may represent the same area at a later time than illustrated in the topology 600 of FIG. 6A. A topology may be dynamic due to changes in the network environment. Network entities may be added or removed. In addition, due to the nature of self organizing plug-n-play devices, network entities may be easily installed or removed by end users. FIG. 6B illustrates changes due to removed or missing cells with elements in dashed lines. Changes due to new cells include elements in shaded areas. For example, the femtocell 610$b$ may be removed or turned off. For example, femtocells 610$e$, 610$f$ may be new femtocells added by end users. Macrocell 610$g$ may be newly installed to provide additional coverage. Femtocell 620 may detect the change in the network topology 650. For example, femtocell 620 may detect the change based on any combination of NLM detection, or through UE reports or messaging. The femtocell 620 may use periodic NLM measurements to detect the PSCs of the new cells 610$e$, 610$f$, 610$g$. If the femtocell 620 stops detecting a cell, e.g., femtocell 610$b$, the femtocell 620 may determine the cell, e.g., femtocell 610$b$, has been removed or turned off. The femtocell 620 may adapt handover, cell reselection, or paging parameters based on the detected changes in the network topology 650.

Figure 7A:
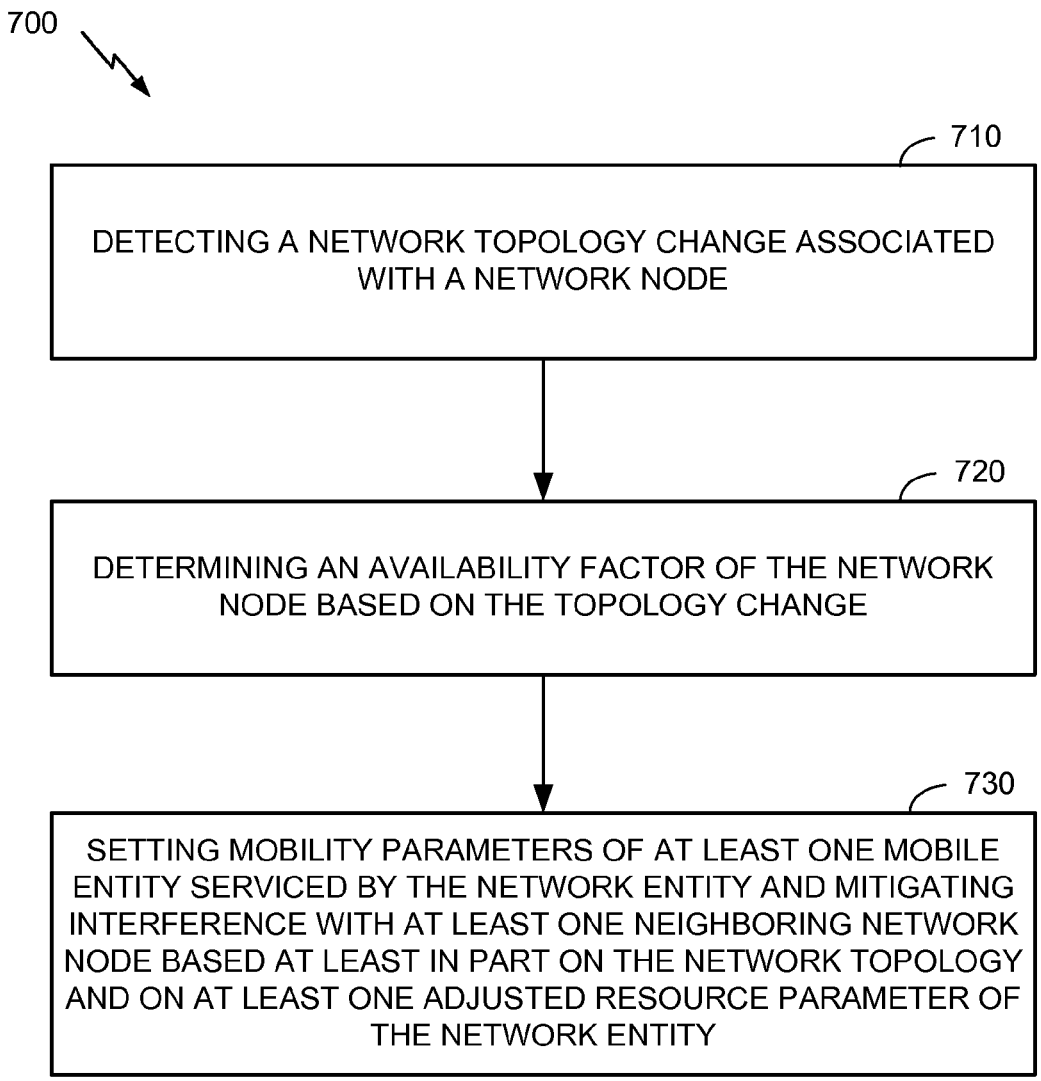
FIG. 7A illustrates aspects of the methodology for adapting femtocell properties based on changes detected in network topology.

In accordance with one or more aspects of the embodiments described herein, with reference to FIG. 7A, there is shown a methodology 700, operable by a network entity, such as, for example, a femtocell, a macrocell, a picocell, or the like. Specifically, method 700 describes a way to adapt femtocell properties based on changes detected in network topology. The method 700 may involve, at 710, detecting a network topology change associated with a network node. The method 700 may involve, at 720, determining an availability factor of the network node based on the topology change. Further, the method may involve, at 730, setting mobility parameters of at least one mobile entity serviced by the network entity and mitigating interference with at least one neighboring network node based at least in part on the network topology and on at least one adjusted resource parameter of the network entity.

Figure 7B:
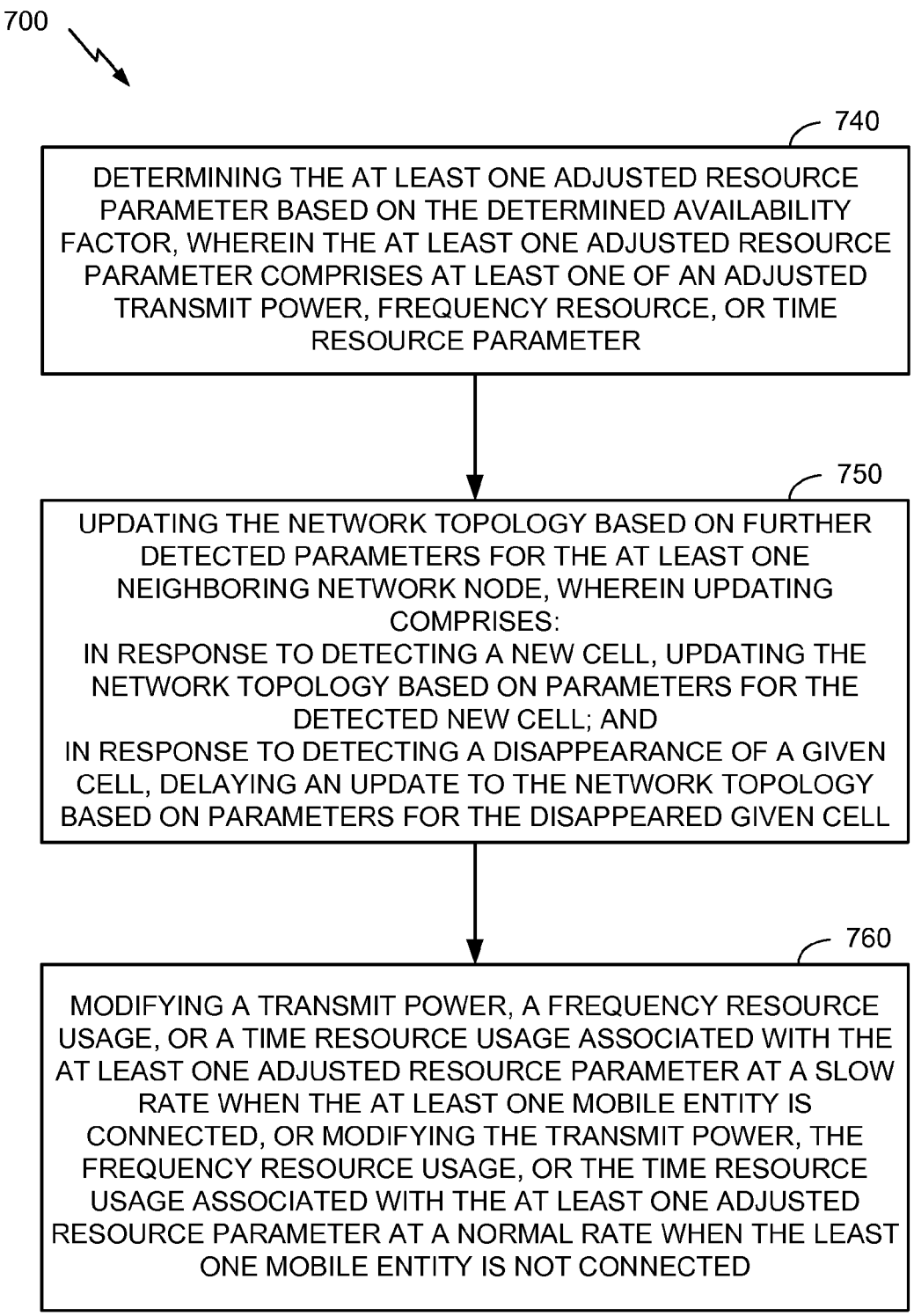
FIG. 7B illustrates more aspects of the methodology for adapting femotocell properties based on changes detected in network topology.

With reference to FIG. 7B, there are shown further operations or aspects of the method 700 that are optional and may be performed by a network entity or the like. If the method 700 includes at least one block of FIG. 7B, then the method 700 may terminate after the at least one block, without necessarily having to include any subsequent downstream block(s) that may be illustrated. It is further noted that numbers of the blocks do not imply a particular order in which the blocks may be performed according to the method 700. For example, the method 700 may further include determining the at least one adjusted resource parameter based on the determined availability factor, wherein the at least one adjusted resource parameter comprises at least one of an adjusted transmit power, frequency resource, or time resource parameter (block 740), updating the network topology based on further detected parameters for the at least one neighboring network node, wherein updating comprises: in response to detecting a new cell, updating the network topology based on parameters for the detected new cell; and in response to detecting a disappearance of a given cell, delaying an update to the network topology based on parameters for the disappeared given cell (block 750), and modifying a transmit power, a frequency resource usage, or a time resource usage associated with the at least one adjusted resource parameter at a slow rate when the at least one mobile entity is connected, or modifying the transmit power, the frequency resource usage, or the time resource usage associated with the at least one adjusted resource parameter at a normal rate when the least one mobile entity is not connected (block 760).

Figure 8:
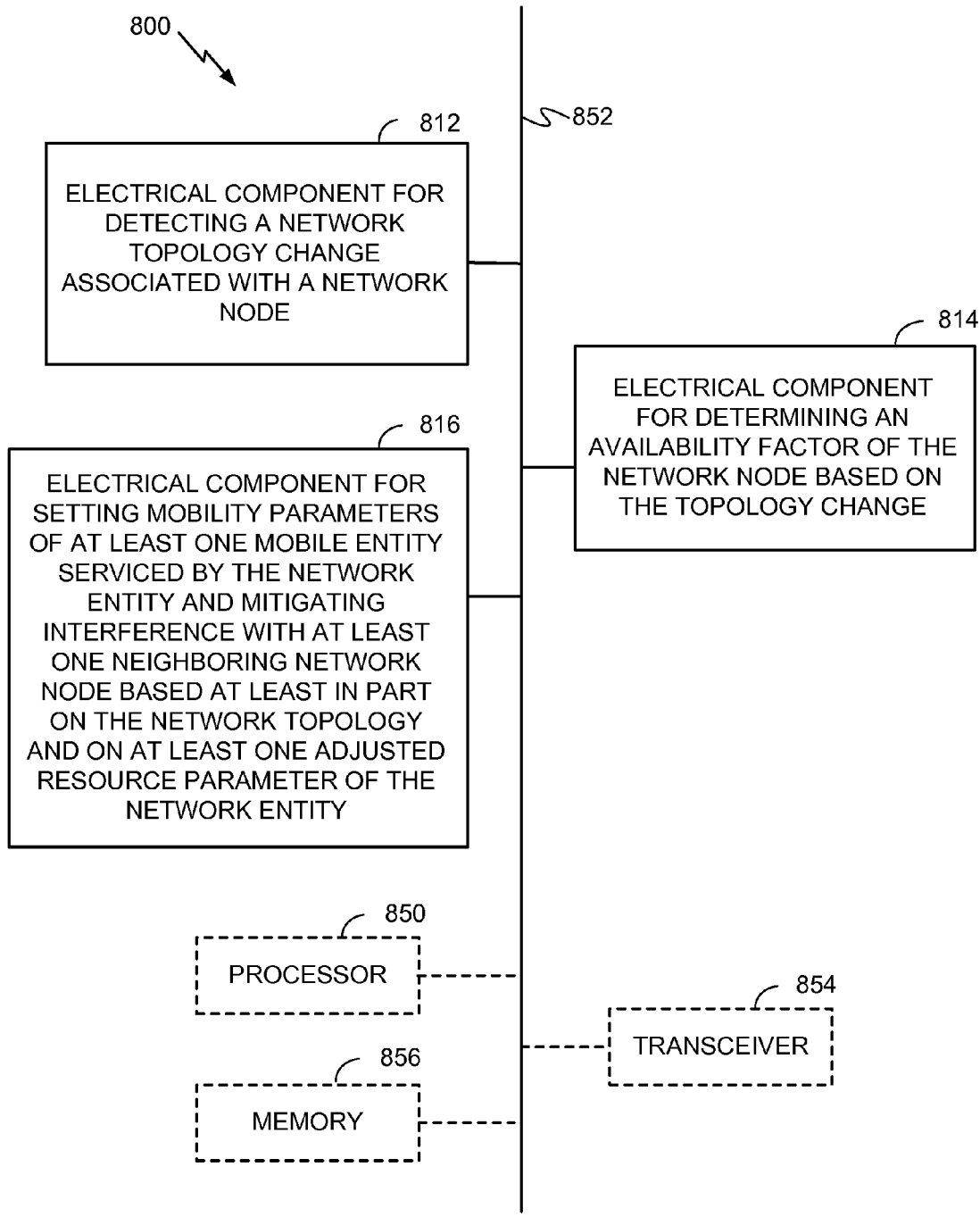
FIG. 8 shows an embodiment of an apparatus for adapting femotocell properties based on changes detected in network topology, in accordance with the methodology of FIGS. 7A-B.

With reference to FIG. 8, there is provided an exemplary apparatus 800 that may be configured as a network entity (e.g., a femtocell, a macrocell, a picocell, or the like) in a wireless network, or as a processor or similar device/component for use within the network entity. The apparatus 800 may include functional blocks that can represent functions implemented by a processor, software, or combination thereof (e.g., firmware). For example, apparatus 800 may include an electrical component or module 812 for detecting a network topology change associated with a network node. The apparatus 800 may also include a component 814 for determining an availability factor of the network node based on the topology change. The apparatus 800 may also include a component 816 for setting mobility parameters of at least one mobile entity serviced by the network entity and mitigating interference with at least one neighboring network node based at least in part on the network topology and on at least one adjusted resource parameter of the network entity.

In related aspects, the apparatus 800 may optionally include a processor component 850 having at least one processor, in the case of the apparatus 800 configured as a network entity (e.g., a femtocell, a macrocell, a picocell, or the like), rather than as a processor. The processor 850, in such case, may be in operative communication with the components 812-816 via a bus 852 or similar communication coupling. The processor 850 may effect initiation and scheduling of the processes or functions performed by electrical components 812-816.

In further related aspects, the apparatus 800 may include a radio transceiver component 854. A stand alone receiver and/or stand alone transmitter may be used in lieu of or in conjunction with the transceiver 854. When the apparatus 800 is a network entity, the apparatus 800 may also include a network interface (not shown) for connecting to one or more core network entities. The apparatus 800 may optionally include a component for storing information, such as, for example, a memory device/component 856. The computer readable medium or the memory component 856 may be operatively coupled to the other components of the apparatus 800 via the bus 852 or the like. The memory component 856 may be adapted to store computer readable instructions and data for effecting the processes and behavior of the components 812-816, and subcomponents thereof, or the processor 850, or the methods disclosed herein. The memory component 856 may retain instructions for executing functions associated with the components 812-816. While shown as being external to the memory 856, it is to be understood that the components 812-816 can exist within the memory 856. It is further noted that the components in FIG. 8 may comprise processors, electronic devices, hardware devices, electronic sub-components, logical circuits, memories, software codes, firmware codes, etc., or any combination thereof.

In accordance with one or more aspects of the embodiments described herein is a methodology operable by a mobile entity, such as, for example, a UE, access terminal, mobile device, mobile terminal, subscriber station, or the like. Specifically, the method describes a way to adapt handover, cell reselection, or paging parameters based on changes detected in network topology. The method may involve receiving, from a network node, an instruction associated with at least one other network node. The method may involve determining at least one parameter of the at least one neighbor network node of the network node in response to receiving the instruction. Further, the method may involve sending, to the network node, the at least one parameter associated with the at least one neighbor network node for coordinating a handoff, cell reselection, or page.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A wireless communication method operable by a network entity, the method comprising:
    detecting a change in a network topology change associated with a network node, the network topology change in the network topology indicating whether the network node is a new cell deployment, a removed node, an unreliable node, or a node with handover unreliability;
    determining an availability factor of the network node based on the change in the network topology change;
    setting mobility parameters of at least one mobile entity serviced by the network entity and mitigating interference with at least one neighboring network node based at least in part on the change in the network topology and on at least one adjusted resource parameter of the network entity;
    in response to detecting, by the network entity, a disappearance of a given cell different than the network entity, delaying an update to the network topology based on parameters for the given cell; and
    modifying a transmit power, a frequency resource usage, a time resource usage, or any combination thereof associated with the at least one adjusted resource parameter at a slow rate when the at least one mobile entity is connected and at a normal rate when the at least one mobile entity is not connected.

2. The method of claim 1, wherein the mobility parameters facilitate coordination of a handoff, a cell reselection, or a page of the at least one mobile entity by the network entity based at least in part on the network topology.

3. The method of claim 1, further comprising determining the at least one adjusted resource parameter based on the determined availability factor, wherein the at least one adjusted resource parameter comprises at least one of an adjusted transmit power, frequency resource, or time resource parameter, or any combination thereof.

4. The method of claim 1, further comprising updating the network topology based on further detected parameters for the at least one neighboring network node, wherein updating comprises:
    in response to detecting a new cell, updating the network topology based on parameters for the detected new cell.

5. The method of claim 1, wherein the change in the network topology change is detected at a network listen module.

6. A wireless communication apparatus comprising:
    at least one processor configured to:
    detect a change in a network topology change associated with a network node, the change in the network topology change indicating whether the network node is a new cell deployment, a removed node, an unreliable node, or a node with handover unreliability,
    determine an availability factor of the network node based on the change in the network topology change,
    set mobility parameters of at least one mobile entity serviced by a network entity and mitigating mitigate interference with at least one neighboring network node based at least in part on the change in the network topology and on at least one adjusted resource parameter of the network entity,
    in response to detecting, by the wireless communication apparatus, a disappearance of a given cell different than the wireless communication apparatus, delay an update to the network topology based on parameters for the given cell, modify a transmit power, a frequency resource usage, a time resource usage, or any combination thereof associated with the at least one adjusted resource parameter at a slow rate when the at least one mobile entity is connected and at a normal rate when the at least one mobile entity is not connected; and a memory coupled to the at least one processor for storing data.

7. The apparatus of claim 6, wherein the mobility parameters facilitate coordination of a handoff, a cell reselection, or a page of the at least one mobile entity by the network entity based at least in part on the network topology.

8. The apparatus of claim 6, wherein the at least one processor is further configured to determine the at least one adjusted resource parameter based on the determined availability factor, wherein the at least one adjusted resource parameter comprises at least one of an adjusted transmit power, frequency resource, or time resource parameter, or any combination thereof.

9. The apparatus of claim 6, wherein the at least one processor is further configured to update the network topology based on further detected parameters for the at least one neighboring network node, wherein updating comprises:
in response to detecting a new cell, updating the network topology based on parameters for the detected new cell.

10. The apparatus of claim 6, wherein the change in the network topology change is detected at a network listen module.

11. A wireless communication apparatus comprising:
means for detecting a change in a network topology change associated with a network node, the change in the network topology change indicating whether the network node is a new cell deployment, a removed node, an unreliable node, or a node with handover unreliability;
means for determining an availability factor of the network node based on the change in the network topology change;
means for setting mobility parameters of at least one mobile entity serviced by a network entity and mitigating interference with at least one neighboring network node based at least in part on the change in the network topology and on at least one adjusted resource parameter of the network entity;
in response to detecting, by the wireless communication apparatus, a disappearance of a given cell different than the wireless communication apparatus, means for delaying an update to the network topology based on parameters for the given cell; and
means for modifying a transmit power, a frequency resource usage, a time resource usage, or any combination thereof associated with the at least one adjusted resource parameter at a slow rate when the at least one mobile entity is connected and at a normal rate when the at least one mobile entity is not connected.

12. The apparatus of claim 11, wherein the mobility parameters facilitate coordination of a handoff, a cell reselection, or a page of the at least one mobile entity by the network entity based at least in part on the network topology.

13. The apparatus of claim 11, further comprising means for determining the at least one adjusted resource parameter based on the determined availability factor, wherein the at least one adjusted resource parameter comprises at least one of an adjusted transmit power, frequency resource, or time resource parameter, or any combination thereof.

14. The apparatus of claim 11, further comprising means for updating the network topology based on further detected parameters for the at least one neighboring network node, wherein updating comprises:
in response to detecting a new cell, updating the network topology based on parameters for the detected new cell.

15. The apparatus of claim 11, wherein the change in the network topology change is detected at a network listen module.

16. A non-transitory computer readable medium comprising code for causing at least one computer to:
detect a change in a network topology change associated with a network node, the change in the network topology change indicating whether the network node is a new cell deployment, a removed node, an unreliable node, or a node with handover unreliability;
determine an availability factor of the network node based on the change in the network topology change;
set mobility parameters of at least one mobile entity serviced by a network entity and mitigating mitigate interference with at least one neighboring network node based at least in part on the change in the network topology and on at least one adjusted resource parameter of the network entity;
in response to detecting, by the at least one computer, a disappearance of a given cell different than the at least one computer, delaying an update to the network topology based on parameters for the given cell; and
modify a transmit power, a frequency resource usage, a time resource usage, or any combination thereof associated with the at least one adjusted resource parameter at a slow rate when the at least one mobile entity is connected and at a normal rate when the at least one mobile entity is not connected.

17. The non-transitory computer readable medium of claim 16, wherein the mobility parameters facilitate coordination of a handoff, a cell reselection, or a page of the at least one mobile entity by the network entity based at least in part on the network topology.

18. The non-transitory computer readable medium of claim 16, further comprising code for causing the at least one computer to determine the at least one adjusted resource parameter based on the determined availability factor, wherein the at least one adjusted resource parameter comprises at least one of an adjusted transmit power, frequency resource, or time resource parameter, or any combination thereof.

19. The non-transitory computer readable medium of claim 16, further comprising code for causing the at least one computer to update the network topology based on further detected parameters for the at least one neighboring network node, wherein updating comprises:
in response to detecting a new cell, updating the network topology based on parameters for the detected new cell.

20. The non-transitory computer readable medium of claim 16, wherein the change in the network topology change is detected at a network listen module.

21. A wireless communication method operable by a network entity, the method comprising:
detecting a change in a network topology change associated with a network node, wherein detecting the change in the network topology change comprises detecting a change in a received signal code power (RSCP) level above a threshold, and wherein the change in the network topology change indicates the network node is an unreliable node, or a node with handover unreliability;

setting mobility parameters of at least one mobile entity serviced by the network entity and mitigating interference with at least one neighboring network node based at least in part on the change in the network topology change and on at least one adjusted resource parameter of the network entity, wherein the mobility parameters facilitate coordination of a handoff or a cell reselection, and the at least one adjusted resource parameter comprises at least one of a handover parameter, or a cell reselection parameter, or any combination thereof; and modifying a transmit power, a frequency resource usage, a time resource usage, or any combination thereof associated with the at least one adjusted resource parameter at a slow rate when the at least one mobile entity is connected and at a normal rate when the at least one mobile entity is not connected.

22. The method of claim 21, wherein detecting the change in the network topology change associated with the network node further comprises:

decoding an overhead message from a neighboring cell, the overhead message including information corresponding to a downlink transmit power of the neighboring cell, or detecting a change in at least one of a handover statistic, cell reselection statistic, paging statistic, or any combination thereof.

23. The method of claim 21, further comprising:
detecting a new primary scrambling code (PSC) corresponding to a first neighboring network node;
detecting a removal of a second PSC corresponding to a second neighboring network node; and
updating information corresponding to the first neighboring network node and the second neighboring network node by adding the new PSC to the information at a first time, and removing the second PSC from the information at a second time, the second time comprising a time subsequent to the first time.

24. A wireless communication apparatus comprising:
at least one processor configured to:
detect, using a network listen module (NLM), a change in a network topology surrounding a cell comprising a change in a reliability associated with at least one neighboring cell; and
adjust at least one resource parameter of the cell based at least in part on the detected change in the network topology surrounding the cell;
set mobility parameters of at least one mobile entity serviced by the cell and mitigate interference with at least one neighboring cell based at least in part on the change in the network topology surrounding the cell and on the at least one adjusted resource parameter; and
modify a transmit power, a frequency resource usage, a time resource usage, or any combination thereof associated with the at least one adjusted resource parameter at a slow rate when the at least one mobile entity is connected and at a normal rate when the at least one mobile entity is not connected.

25. The wireless communication apparatus of claim 24, wherein to detect, using the NLM, the change in the network topology surrounding the cell further comprises:
using periodic NLM measurements to detect the at least one neighboring cell.

26. The wireless communication apparatus of claim 25, wherein to detect at least one new neighboring cell includes detecting at least one new primary scrambling code (PSC) associated with the at least one new neighboring cell.

27. The wireless communication apparatus of claim 24, wherein to adjust at least one resource parameter of the cell includes adjusting at least one of a transmit power parameter, frequency resource parameter, time resource parameter, or any combination thereof.

28. The wireless communication apparatus of claim 24, wherein to detect, using the NLM, the change in the network topology surrounding the cell further comprises detecting that a neighboring cell has become unreliable, and wherein to adjust at least one resource parameter of the cell includes adjusting a downlink transmit power parameter of the cell to utilize available frequency or time blocks.

29. The wireless communication apparatus of claim 24, wherein to detect, using the NLM, the change in the network topology surrounding the cell further comprises detecting an addition or a removal of at least one neighboring cell and determining that the addition or the removal of the at least one neighboring cell results in handover unreliability, and wherein to adjust at least one resource parameter of the cell includes adjusting a downlink transmit power parameter of the cell to optimize coverage or at least one handover boundary.

* * * * *